United States Patent [19]

Schuster et al.

[11] Patent Number: 4,877,339

[45] Date of Patent: Oct. 31, 1989

[54] BEARING SUPPORT OF A THROTTLE VALVE SHAFT IN THE HOUSING OF AN EXHAUST GAS LINE

[75] Inventors: Hans-Dieter Schuster, Schorndorf; Christoph Noller, Winnenden; Gottfried Wollenraupt; Reiner Kreeb, both of Stuttgart; Roland Huss, Esslingen, all of Fed. Rep. of Germany

[73] Assignee: Daimler-Benz AG, Stuttgart, Fed. Rep. of Germany

[21] Appl. No.: 304,123

[22] Filed: Jan. 31, 1989

[30] Foreign Application Priority Data

Jan. 26, 1988 [DE] Fed. Rep. of Germany ....... 3802243

[51] Int. Cl.⁴ .............................................. F16C 17/02

[52] U.S. Cl. .................................... 384/218; 384/271; 384/907.1; 384/903; 251/303

[58] Field of Search ............... 384/218, 271, 219, 225, 384/907.1, 913, 903, 215; 251/303

[56] References Cited

U.S. PATENT DOCUMENTS

| | | | |
|---|---|---|---|
| 2,016,757 | 10/1935 | Tryon | 384/271 |
| 3,319,098 | 5/1967 | Hartman | 384/271 |
| 3,477,771 | 11/1969 | Herbenar | 384/218 |
| 3,774,879 | 11/1973 | Zink | 251/303 |

FOREIGN PATENT DOCUMENTS

| | | |
|---|---|---|
| 1214932 | 4/1966 | Fed. Rep. of Germany . |
| 2063369 | 7/1972 | Fed. Rep. of Germany . |
| 340379 | 9/1959 | Switzerland . |

*Primary Examiner*—Lenard A. Footland
*Attorney, Agent, or Firm*—Barnes & Thornburg

[57] ABSTRACT

The invention relates to bearing support of a throttle valve shaft in the housing of an exhaust gas line in which the shaft is rotatably supported on both sides in a bearing sleeve element constructed cup-shaped. The cups themselves are retained by spring force against the housing extending correspondingly conically within these areas. In order to keep small the actuating forces necessary for the rotation of the throttle valve shaft, each bearing sleeve element is retained by itself against the housing by means of a spring supported at the housing and the securing of the shaft against any axial displacement takes place by a separate axial bearing.

8 Claims, 1 Drawing Sheet

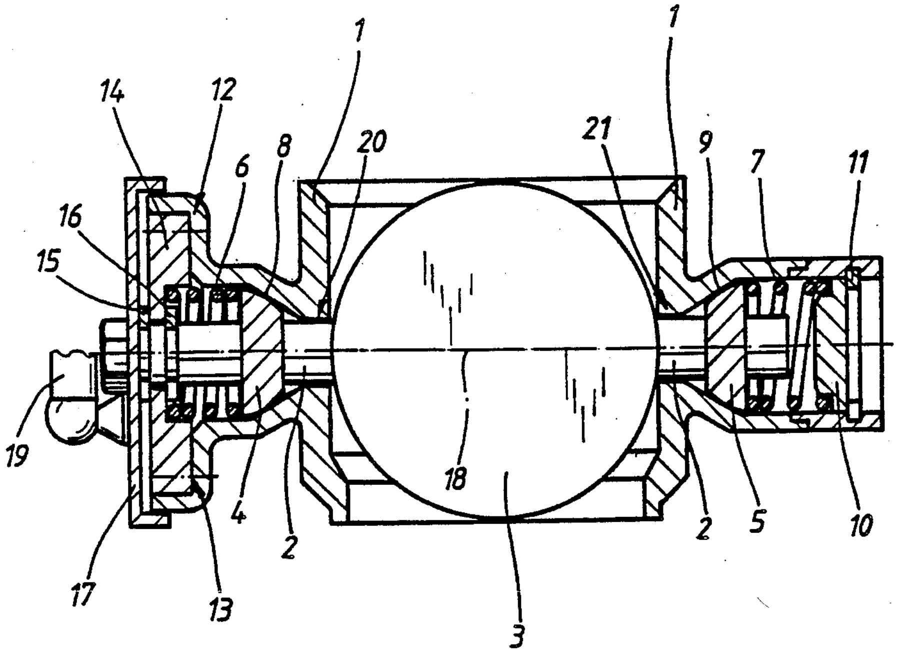
1
1
14
12
6
8
20
21
9
7
11
16
15
19
18
4
2
2
5
10
17
13
3

BEARING SUPPORT OF A THROTTLE VALVE SHAFT IN THE HOUSING OF AN EXHAUST GAS LINE

BACKGROUND AND SUMMARY OF THE INVENTION

The present invention relates to a bearing support of a throttle valve shaft in the housing of an exhaust gas line in which the shaft is rotatably supported on both sides in one cup-shaped bearing sleeve element and in which the housing is constructed conically within the areas of the bearing sleeve elements whereby the interior cross-sectional surface of the housing within the area of a bearing sleeve element and the external cross-sectional surface of the latter taper in the same direction.

With such a bearing support, used in series-produced vehicles of the assignee of the present application, by means of which slight shaft bendings and minimum axial offsets of the bearings can be automatically compensated, a bearing sleeve element is retained against the housing by means of an axially acting compression spring. The same spring is simultaneously supported also at a spring plate which is securely connected with the throttle valve shaft. The axially acting spring force is therewith further transmitted by way of the shaft to the oppositely disposed bearing, as a result of which the latter is also retained against the housing. This "inner stressing" of the shaft, however, leads to the fact that larger friction forces may occur between this bearing sleeve element and the components retaining the same against the housing (spring plate, respectively, on the other side an axially fixed disk) during an actuation of the throttle valve. As a result thereof, relatively high actuating forces are required for the rotation of the throttle valve shaft.

The present invention is therefore concerned with the task to provide a bearing support of the type described hereinabove in which the forces necessary for the actuation of the throttle valve shaft are kept to a minimum.

The underlying problems are solved according to the present invention in that each bearing sleeve element is retained by itself against the housing by means of a spring supported at the housing and in that the shaft is secured against axial displacement by means of a separate axial bearing.

Due to the fact that the two springs retaining the bearing sleeve elements against the housing are supported directly at the housing, no bearing-conditioned or stress-conditioned axial forces act any longer on the shaft itself so that during the actuation of the shaft, no increased friction forces have to be overcome any longer, whereby the provided separate axial bearing generally precludes a displacement of the shaft in case of eventually occurring minimum axial forces during an actuation of the throttle valve.

A particularly simple and therewith also cost-favorable construction of the axial bearing is obtained in accordance with the present invention if the axial bearing is formed of two retaining rings axially fixed on the shaft which are abuttingly disposed to both sides of a pressure plate fixedly connected with the housing and absorbing the spring force.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view of a bearing support of a throttle valve shaft in accordance with the present invention.

DETAILED DESCRIPTION OF THE DRAWING

Referring now to the single FIGURE of the drawing, the housing of an exhaust gas line of an internal combustion engine is designated by reference numeral 1 in which is supported a shaft 2 that carries a throttle valve 3 controlling the cross section of the exhaust gas line. The throttle valve shaft 2 is rotatably supported on both sides in a bearing sleeve element 4, respectively, 5 constructed as ceramic, generally hemispherically-shaped cup. The ceramic cups 4 and 5 are themselves retained by way of one compression spring 6 and 7 each with their outer surface 8 and 9 against the housing 1 which extends conically within these areas in the manner shown in the drawing. The spring 7 is thereby supported on the right bearing side, as viewed in the drawing, by way of a spring plate 10 at a retaining ring 11 axially fixed in the housing 1 and the spring 6 on the left side is thereby supported at a pressure plate 14 fixedly screwed together with the housing 1 at the plates 12 and 13. The pressure plate 14 is so constructed that it surrounds the shaft 2 with only minimal play. It serves therewith at the same time as an abutment collar not connected with the shaft 2, against which on both sides thereof one retaining ring 15, respectively, 16 axially fixed on the shaft 2 is disposed.

At its left end side, a cover 17 is threadably secured to the shaft 2, at which a lever 19 only schematically indicated in the drawing for the actuation of the throttle valve 3 is secured again at a predetermined distance to the longitudinal axis 18 of the shaft 2.

Owing to the two retaining rings 15 and 16, acting in a simple manner as axial bearing and abutting on the two sides against the pressure plate 14, it is assured that the throttle valve shaft 2 does not experience any axial displacement during a rotation as a result of axial forces eventually introduced by way of the actuating lever 19.

In the areas 20 and 21 in which the throttle valve shaft 2 enters into the housing 1, the housing 1 is so constructed that it surrounds the shaft 2 only with a minimum clearance so that already at these locations a relatively good seal against outflowing exhaust gases exists. The final sealing, however, takes place by means of the ceramic cups 4 and 5 retained securely against the housing 1 by means of the two compression springs 6 and 7.

The present invention, of course, is not limited to the arrangement of cups or hemispherical members and housing to one another as illustrated in the drawing. It is also possible to insert the cups in such a manner that they do not taper in the direction toward the throttle valve 3 but in the direction of the two shaft ends. Of course, a corresponding reversal of the conicity of the housing 1 in the mentioned areas must then be provided, whereby also the springs are not to be designed as compression springs but instead as drawsprings.

Quite generally, it is thus true that, in relation to the longitudinal axis 18 of the throttle valve 2, the inner cross-sectional surface of the housing 1 in the area of a cup 4, respectively, 5 and the outer cross-sectional surface of a cup 4, respectively, 5 must always taper in the same direction.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A bearing support of a throttle valve shaft within the housing of an exhaust gas line, comprising bearing sleeve means of cup-shaped construction for rotatably supporting the shaft on both sides, the housing being constructed conically within the area of the bearing sleeve means, with the inner cross-sectional surface of the housing within the area of a bearing sleeve means and the outer cross-sectional surface of the latter tapering in the same direction, the bearing sleeve means being retained in the axial direction against the housing by way of their outer surfaces by at least one spring means acting in the direction of the shaft longitudinal axis, each bearing sleeve means being retained by itself against the housing by means of a spring means supported at the housing, and a separate axial bearing means securing the shaft against axial displacement.

2. A bearing support of a throttle valve shaft according to claim 1, wherein the bearing sleeve means consist of a ceramic material.

3. A bearing support of a throttle valve shaft according to claim 2, wherein the axial bearing means includes two retaining rings axially fixed on the sahft which abut on both sides against a pressure plate securely connected with the housing and absorbing the spring force.

4. A bearing support of a throttle valve shaft according to claim 3, wherein the spring means is supported against a retaining ring axially fixed in the housing by way of a spring plate.

5. A bearing support of a throttle valve shaft according to claim 1, wherein the axial bearing means includes two retaining rings axially fixed on the shaft which abut on both sides against a pressure plate securely connected with the housing and absorbing the spring force.

6. A bearing support of a throttle valve shaft according to claim 1, wherein the spring means is supported against a retaining ring axially fixed in the housing by way of a spring plate.

7. A bearing support of a throttle valve shaft according to claim 6, wherein the bearing sleeve means consist of a ceramic material.

8. A bearing support of a throttle valve shaft according to claim 6, wherein the axial bearing means includes two retaining rings axially fixed on the shaft which abut on both sides against a pressure plate securely connected with the housing and absorbing the spring force.

* * * * *